Dec. 5, 1933.  E. H. SERRANO  1,938,049
ROAD AND RAIL VEHICLE
Filed June 24, 1932  3 Sheets-Sheet 1

Inventor
Edmundo H. C. Serrano

By  H. H. Bryant
Attorney.

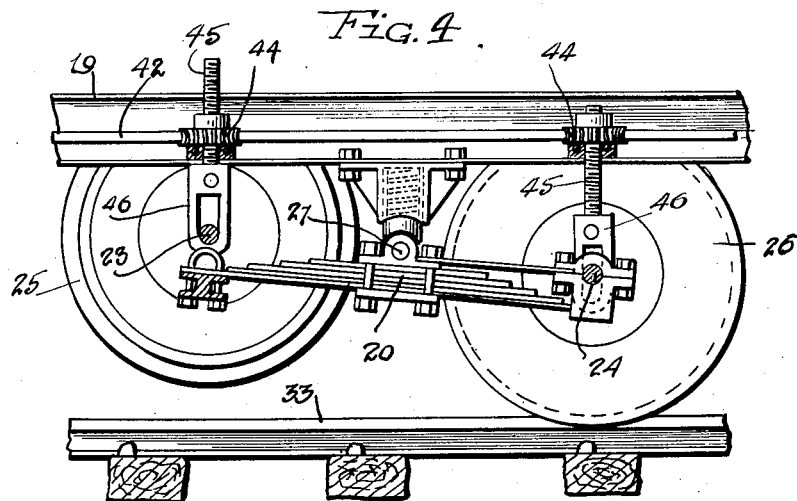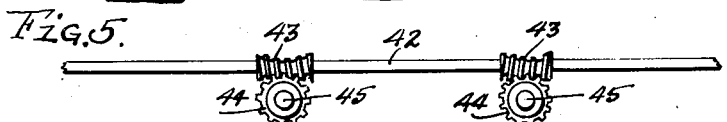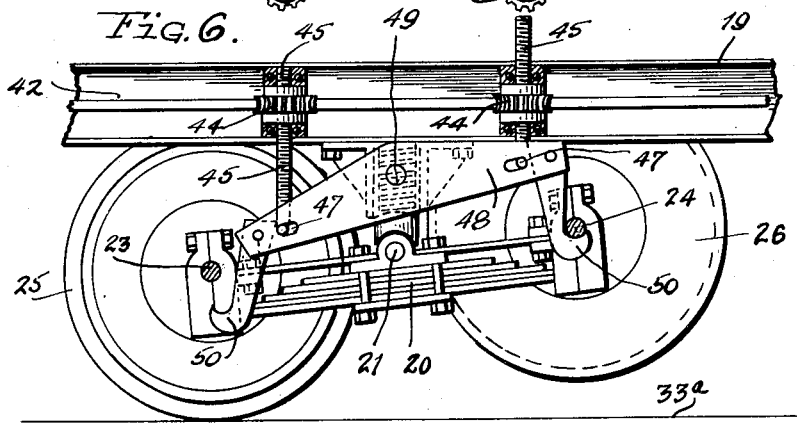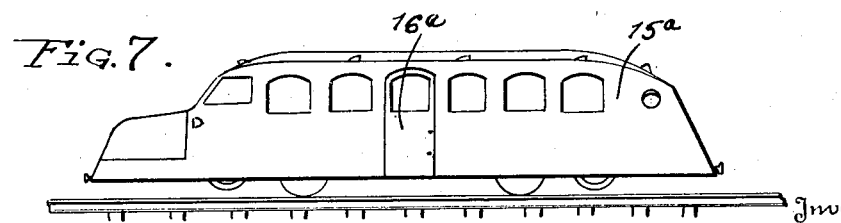

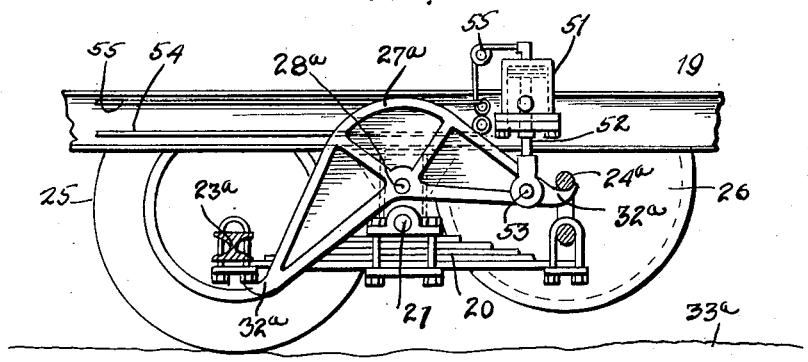
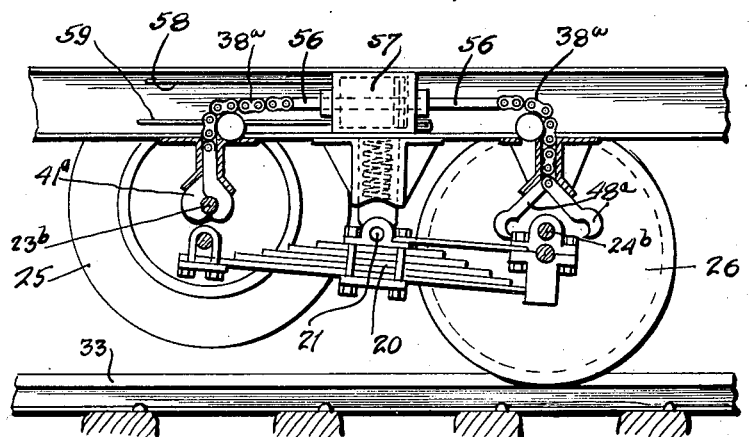
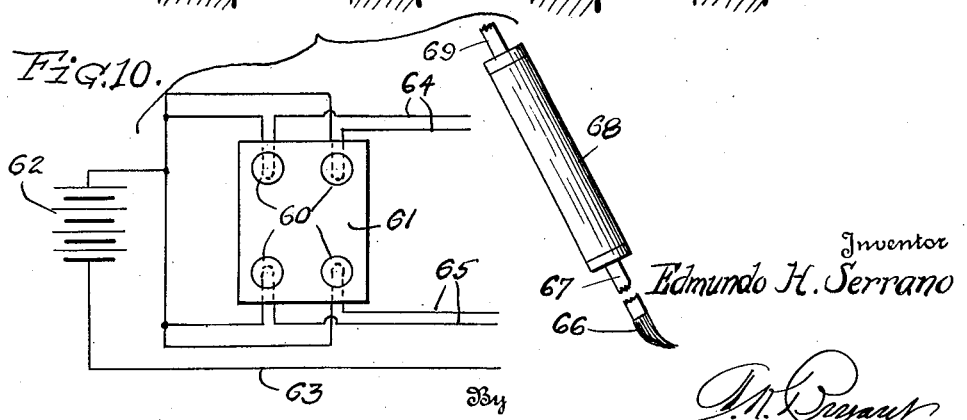

Patented Dec. 5, 1933

1,938,049

UNITED STATES PATENT OFFICE 1,938,049

ROAD AND RAIL VEHICLE

Edmundo H. Serrano, Mexico, Mexico, assignor to Luella J. Serrano, St. Louis, Mo.

Application June 24, 1932, Serial No. 619,158, and in Mexico February 11, 1932

7 Claims. (Cl. 105—215)

This invention relates to certain new and useful improvements in road and rail vehicles.

The primary object of the invention is to provide a combined road and rail vehicle in which the trucks of the vehicle carry double sets of wheels for road or railway track travel that may be selectively moved into service position.

A further object of the invention is to provide a combined road and rail vehicle operating in a manner to reduce the cost of transportation of freight and passengers, the vehicle to be operated over roads or streets for picking up freight and passengers and then operating on a railroad track with greater speed and economy as well as safety.

A still further object of the invention is to provide a vehicle of the foregoing character wherein a spring member carried by each truck of the vehicle supports road and rail track wheels with the spring member pivotally supported upon the vehicle truck and shifted by mechanical or pneumatically operated means for placing either the road, such as rubber tired wheels, or track rail wheels in service position.

A still further object of the invention is to provide an electrical contact member or brush arranged forwardly of the railway track wheels to be lowered by pneumatic devices into electrical contact with the track rail to indicate to the driver of the vehicle through the medium of illuminating means on the instrument board that the track wheels are aligned with the track rails so that the track wheels may be lowered with safety into service position.

With the above and other objects in view that will become apparent as the nature of the invention is better understood, the same consists in the novel form, combination and arrangement of parts hereinafter more fully described, shown in the accompanying drawings and claimed.

In the drawings:—

Figure 4 is a vertical longitudinal sectional view showing a worm, worm wheel and screw adjustment or shifting means for the wheel supporting spring;

Figure 5 is a top plan view showing the worm and worm wheel drive;

Figure 6 is a vertical longitudinal sectional view showing another form of operating or shifting means for the spring;

Figure 7 is a side elevational view of a passenger form of vehicle equipped with the road and track rail wheels;

Figure 8 is a side elevational view of a vehicle truck shifting means for the wheel supporting spring operated by pneumatic devices including a fluid operated piston and rod;

Figure 9 is a vertical longitudinal sectional view of a truck in which chain and grab hooks for shifting the wheel carrying springs are pneumatically operated; and Figure 10 diagrammatically illustrates an electric contact or brush member to be moved into engagement with a track rail to indicate the positioning of the railway track wheels with respect to the rail.

Figure 3:
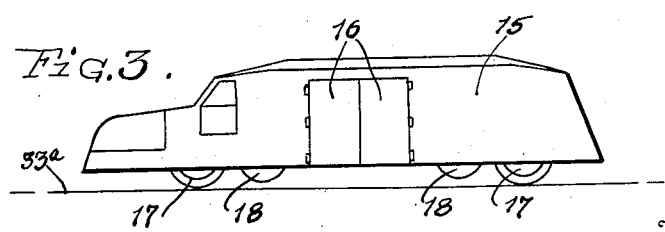
Figure 3 is a side elevational view of a freight truck or vehicle equipped with road and rail wheels.

As shown in Figure 3, the vehicle 15 is designed for the transportation of freight or the like, being equipped with hinged side doors 16, with the front and rear trucks thereof each provided with a pair of cross-axles respectively carrying upon opposite ends ground or road wheels 17 of the rubber tired character, and railway track wheels 18, the road wheels 17 in Figure 3 being illustrated as in service position with the railway track wheels 18 elevated into inoperative positions.

Figure 1:
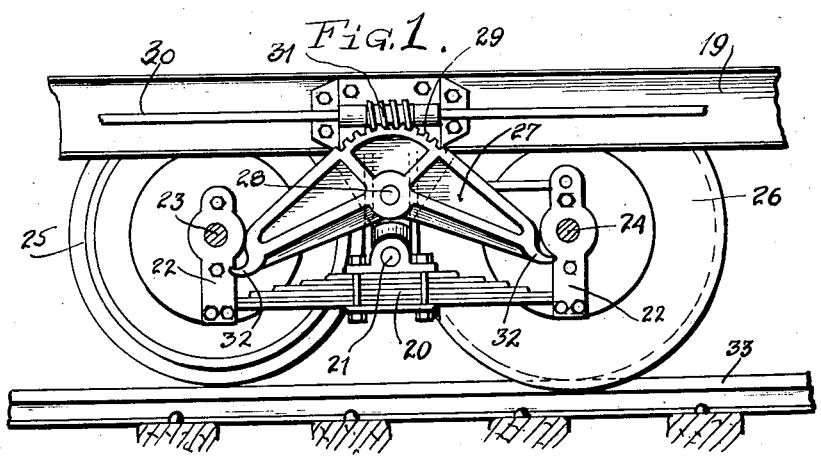
Figure 1 is a fragmentary side elevational view of a truck of a combined road and rail vehicle showing a suspension spring pivotally mounted intermediate its ends and carrying at opposite ends road and track rail wheels respectively with rack and pinion operating mechanism for shifting the spring on its pivot mounting for placing either the road or track rail wheels in service position.

As shown in Figure 1, the vehicle includes side chassis bars 19 supporting a truck upon which a leaf spring 20 is pivotally mounted intermediate its ends as at 21. Shackles or bearings 22 are carried by the opposite ends of the leaf spring 20 and respectively support cross axles 23 and 24, road wheels 25 of the rubber tired type being mounted upon the ends of the axle 23 while railway track wheels 26 are mounted upon the ends of the cross-axle 24.

A frame lever 27 is pivotally mounted intermediate its ends as at 28 upon the vehicle truck directly above the spring pivot 21, the upper side of the frame lever 27 being of arcuate formation, centered on the pivot 28 and provided with worm teeth 29. A mechanically, pneumatically or otherwise operated shaft 30 is journalled longitudinally of the chassis bar 19 and is provided with a worm 31 in meshing engagement with the worm teeth 29 upon the frame lever 27. The opposite ends of the frame lever 27 are directed downwardly and each end carries a hook 32 normally disposed below an adjacent axle 23 or 24. The reference character 33 designates a railway track rail.

Assuming that the vehicle 15 is to be operated on the road bed 33a as shown in Figure 3, the shaft 30 is rotated for imparting pivotal movement to the frame lever 27 to the worm and gear connection 31—29 for raising the hooked end 32 of the frame lever adjacent the axle 24, the frame lever hook 32 being engaged with the axle 24 to elevate the same and the track rail wheels 26 carried thereby, this action imparting pivotal movement to the spring 20 to cause the same to assume an angular position relative to the longitudinal axis of the vehicle 15 so that the road wheels 25 are brought into service position. Upon rotation of the shaft 30 in the opposite direction, the frame lever 27 is moved upon its pivot 29, permitting the rail wheels 26 to be lowered into service position with respect to the track rails 33 while the road wheels 25 are elevated by means of the hook 32 on the frame lever engaged with the axle 23.

Figure 2:
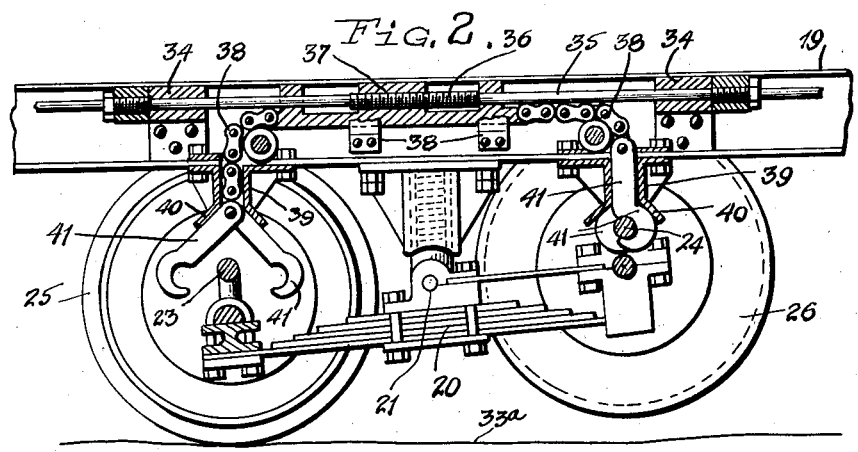
Figure 2 is a vertical longitudinal sectional view of a vehicle truck showing another form of operating mechanism for shifting the spring mounting for the wheels in the form of link and toggle mechanism.

Another form of operating means for shifting the springs as well as raising or lowering the road or track rail wheels is illustrated in Figure 2, the chassis bar 19 carrying bearing blocks 34 in which a shaft 35 is swivelled, the intermediate portion of the shaft 35 carrying a screw portion 36 threaded through a screw block 37 slidable in guides 37a carried by the chassis bar 19. A link chain 38 is attached to each end of the screw block 37 with the free ends thereof directed downwardly through guide channels 39 having their lower flared ends 40 with the outer end of each link chain carrying a pair of grapple hooks 41 disposed above an adjacent cross-axle 23 or 24 to be selectively engaged therewith for operation of the screw 36 upon the shaft 35 for raising or lowering either pair of wheels. The grapple hooks 41 are disposed above their associated axle and when operated, the flared lower ends 40 of the guide channels 39 cause the grapple hooks to move toward each other into grappling engagement with the associated axle as will at once be obvious from an inspection of Figure 2. The axles 23 and 24 are supported upon the spring 20 as at 21 and described more in detail in connection with Figure 1.

In the form of the invention illustrated in Figures 4 and 5, a shaft 42 is journalled longitudinally of the chassis bar 19 and carries a worm 43 engaged with a worm wheel 44 having a threaded bore through which a screw 45 passes, the lower end of the screw 45 carrying a link 46 loosely engaged with an associated axle 23 or 24. The axles 23 and 24 are supported at the outer ends of the spring 20 that is pivoted intermediate its ends as at 21 and upon rotation of the shaft 42 in the direction desired, screws 45 are raised or lowered for shifting the road wheel 25 or track rail wheel 26 into service position, the latter in Figure 4 being illustrated as supported or riding upon the track rail 33.

The mechanism for shifting the road and track rail wheels in the form of the invention illustrated in Figure 6, is the same as shown in Figures 4 and 5 except that the lower ends of the screws 45 have a pin and slot connection 47 with a lever 48 that is pivotally mounted as at 49 upon the vehicle truck. Each end of the lever 48 carries a pivoted hook 50 normally disposed below the associated axle 23 or 24 so that upon operation of the worm gear mechanism, the lever 48 is moved upon its pivot 49 to cause either of the hooks 50 to raise an adjacent axle or permit lowering movement of the other axle, both of said axles being respectively supported at the outer ends of the spring 20 that is pivotally supported intermediate its ends as at 21.

The form of road and track rail wheel support shown in Figure 8 is similar to the construction of the invention illustrated in Figure 1 including a spring 20 pivotally supported intermediate its ends as at 21 upon the vehicle truck while the frame lever 27a is pivotally supported on the truck as at 28a above the spring pivot 21. A hook 32a is formed at each end of the frame lever 27a and is associated with an adjacent axle member 23a and 24a. A pump cylinder 51 is vertically supported upon the chassis bar 19 adjacent one end of the frame lever 27a, the cylinder 51 housing a pump piston that includes a piston rod 52 projecting outwardly of the cylinder and having a pivotal connection 53 with the frame lever 27a adjacent one end thereof. Fluid pressure from a suitable source is delivered by means of the pipes 54 and 55 to opposite ends of the cylinder 51 for reciprocating the piston therein to effect pivotal movement of the frame lever 27a.

The wheel shifting mechanism shown in Figure 9 is similar to the form of invention illustrated in Figure 2, the leaf spring 20 being supported intermediate its ends as at 21 upon the truck of the vehicle and carrying at each of its ends the axle members 23b and 24b. The link chains 38a carry grapple hooks 41a to be engaged with the axle members 23b and 24b, the other ends of the link chains 38a being attached to the opposite ends of a piston rod 56 projecting from the pump cylinder 57 that houses a piston which is reciprocated in the pump cylinder by means of fluid line pipes 58 and 59 respectively entering opposite ends of the cylinder.

When it is desired to bring the railway track wheels into service position and to determine the exact relationship between the rail wheels and the rails before lowering movement of the wheels the detector device illustrated in Figure 10 is brought into play. The lamp bulb 60 upon the instrument board 61 of the vehicle having wire connections with a source of potential 62 is grounded as at 63, the wires 64 extending to front wheel contact while the wires 65 extend to rear wheel contact. A contact brush 66 is carried by a piston rod 67 and working in a cylinder 68 that is in communication with a source of fluid supply by means of a pipe line 69, the contact brush 66 being first lowered and when engaged with a rail 33, the circuit is completed for the illumination of the lamps 60 to indicate to the operator of the vehicle that the railway track wheels 26 are directly located above the track rails 33 so that they may be lowered into service position.

From the above detailed description of the invention, it is believed that the construction and operation thereof will at once be apparent, and while there is herein shown and described the preferred embodiments of the invention, it is nevertheless to be understood that minor changes may be made therein without departing from the spirit and scope of the invention as claimed.

A vehicle for hauling freight is shown in Figure 3 as described while Figure 7 shows a passenger vehicle 15a having a side door entrance 16a, the same being equipped with road and track rail wheels.

I claim:—

1. In a combined road and rail vehicle, two sets of road and track rail wheels, axles supporting the wheels, a mounting spring for the wheels pivotally supported between its ends with the road wheels at one end of the spring and the track rail wheels at the other end of the spring, and means for raising and lowering either set of wheels into and out of service position including means associated with each axle and operating in a manner whereby the means of one axle is engaged therewith for lifting the same while the means of the other axle is shifted to inoperative position relative to its axle to permit lowering movement of the axle and wheels carried thereby.

2. In a combined road and rail vehicle, two sets of road and rail track wheels, axles supporting the wheels, a mounting spring for the wheels pivotally supported between its ends with the road wheels at one end of the spring and the track rail wheels at the other end of the spring, and means for raising and lowering either set of wheels into and out of service position, including means associated with each axle and operating in a manner whereby the means of one axle is engaged therewith for lifting the same while the means of the other axle is disengaged from its axle to permit lowering movement of the axle and wheels carried thereby.

3. In a combined road and rail vehicle, two sets of road and rail track wheels, axles supporting the wheels, a mounting spring for the wheels pivotally supported between its ends with the road wheels at one end of the spring and the track rail wheels at the other end of the spring, and means for raising and lowering either set of wheels into and out of service position including a slide block, a chain attached to each end of the block and grapple hooks on the outer ends of the chains for engagement with an associated axle.

4. In a combined road and rail vehicle, two sets of road and rail track wheels, axles supporting the wheels, a mounting spring for the wheels pivotally supported between its ends with the road wheels at one end of the spring and the track rail wheels at the other end of the spring, means for raising and lowering either set of wheels into and out of service position engageable with the wheel axles and including a slide block, a chain attached to each end of the block and grapple hooks on the outer ends of the chains for engagement with an associated axle.

5. In a combined road and rail vehicle, two sets of road and rail track wheels, axles supporting the wheels, a mounting spring for the wheels pivotally supported between its ends with the road wheels at one end of the spring and the track rail wheels at one other end of the spring, and means for raising and lowering either set of wheels into and out of service position associated with each axle and operating in a manner whereby the means of one axle is engaged therewith for lifting the same while the means of the other axle is disengaged from its axle to permit lowering movement of the axle and wheels carried thereby and including a slide block, a chain attached to each end of the block and grapple hooks on the outer ends of the chains for engagement with an associated axle.

6. In a combined road and rail vehicle, two sets of road and rail track wheels, axles supporting the wheels, a mounting spring for the wheels pivotally supported between its ends with the road wheels at one end of the spring and the track rail wheels at the other end of the spring, means for raising and lowering either set of wheels into and out of service position associated with each axle and operating in a manner whereby the means of one axle is engaged therewith for lifting the same while the means of the other axle is disengaged from its axle to permit lowering movement of the axle and wheels carried thereby and including screw members and worm gear drives therefor and a link member carried by each screw member loosely engaged with an associated axle.

7. In a combined road and rail vehicle, two sets of road and rail track wheels, axles supporting the wheels, a mounting spring for the wheels pivotally supported between its ends with the road wheels at one end of the spring and the track rail wheels at the other end of the spring, means for raising and lowering either set of wheels into and out of service position associated with each axle and operating in a manner whereby the means of one axle is engaged therewith for lifting the same while the means of the other axle is disengaged from its axle to permit lowering movement of the axle and wheels carried thereby and including a pivotally mounted frame lever, a hook at each end thereof for lifting engagement with an axle and a hydraulic pump having a piston rod connection with the frame lever for operation thereof.

EDMUNDO H. SERRANO.